United States Patent [19]
Wilson

[11] Patent Number: 5,938,221
[45] Date of Patent: Aug. 17, 1999

[54] TAPERED CONVOLUTE LEAF SPRING FOR TRUCK SUSPENSIONS

[75] Inventor: William Wilson, Downers Grove, Ill.

[73] Assignee: The Boler Company, Itasca, Ill.

[21] Appl. No.: 08/986,473

[22] Filed: Dec. 8, 1997

[51] Int. Cl.[6] .................................................. B60G 11/46
[52] U.S. Cl. ........................... 280/124.163; 280/124.175; 267/31; 267/47; 267/260
[58] Field of Search ........................ 280/124.163, 124.17, 280/124.175; 267/44, 47, 260, 31

[56] References Cited

U.S. PATENT DOCUMENTS

| | | | |
|---|---|---|---|
| 1,411,885 | 4/1922 | Hill | 267/44 |
| 1,859,105 | 5/1932 | Munro | 267/47 |
| 2,945,702 | 7/1960 | Winkelmann | 280/124.163 |
| 3,250,546 | 5/1966 | Allison | 280/124.175 |
| 3,850,445 | 11/1974 | Borns et al. | 28/124.163 |
| 4,412,690 | 11/1983 | Prokop et al. | 280/124.175 |

*Primary Examiner*—Peter C. English
*Attorney, Agent, or Firm*—Lockwood, Alex, Fitzgibbon & Cummings

[57] ABSTRACT

A leaf spring for use in a suspension system is disclosed which includes an eye for attachment with the frame member on one side of a vehicle chassis. A front cantilever portion of the leaf spring extends from the eye to a predetermined point of the leaf spring. A rear cantilever portion extends from the predetermined point to its own endpoint which is positioned in close proximity to the end of the leaf spring. The front cantilever portion of the leaf spring has a relatively high spring rate and the rear cantilever portion has a relatively low spring rate to provide comfortable riding conditions for the vehicle and roll stability for the suspension system while eliminating the practical necessity of implementing auxiliary roll stabilizers within the suspension system.

17 Claims, 3 Drawing Sheets

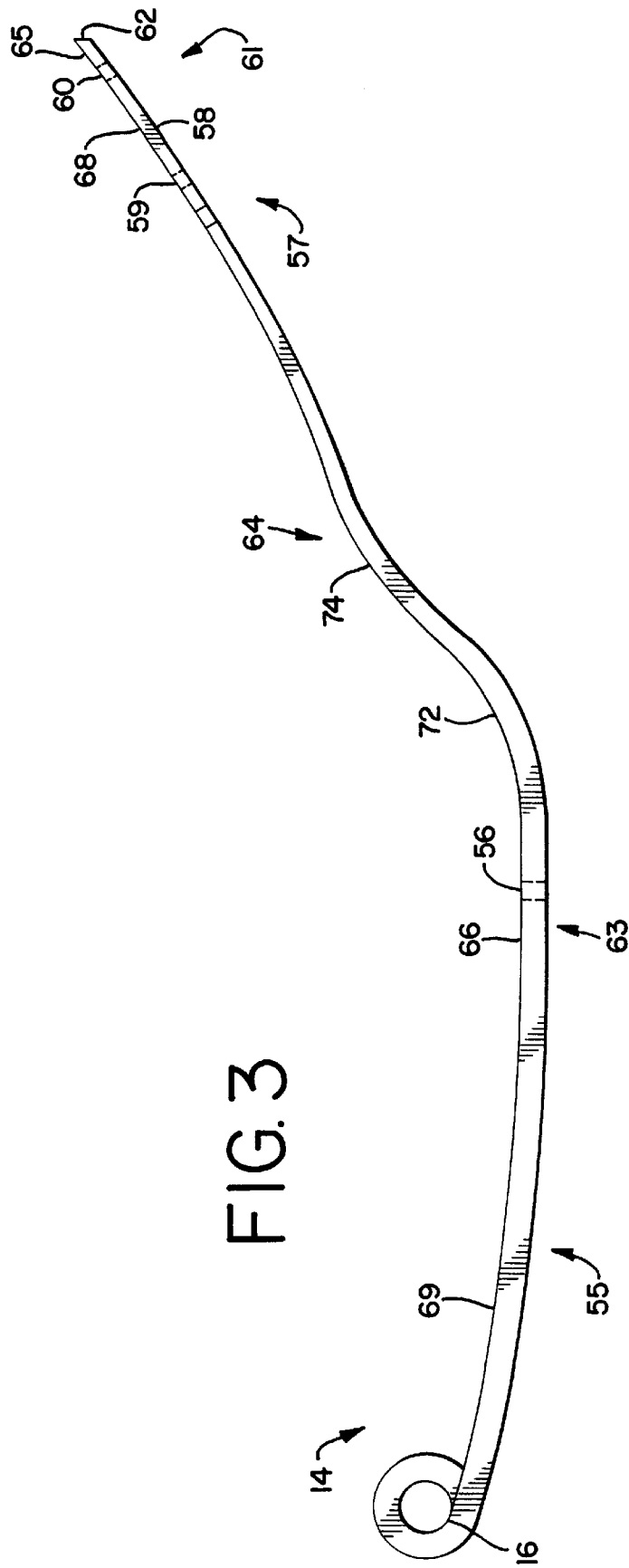
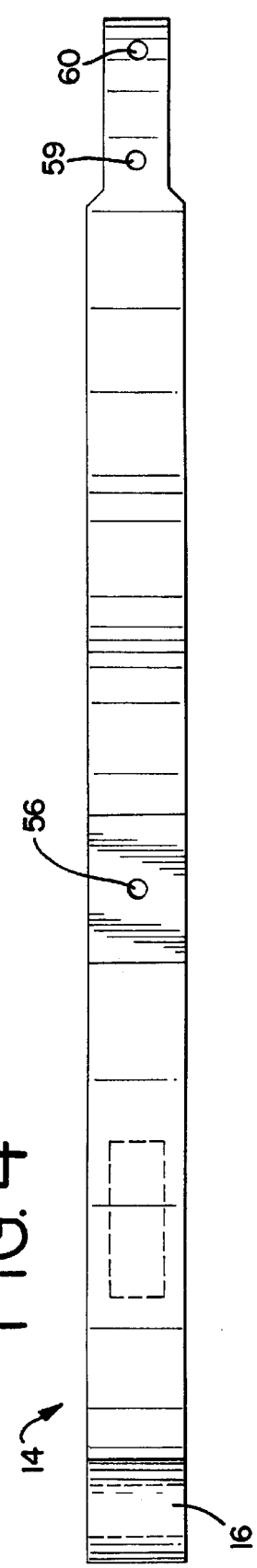

TAPERED CONVOLUTE LEAF SPRING FOR TRUCK SUSPENSIONS

BACKGROUND OF THE INVENTION

The present invention relates to innovations and improvements in axle suspensions for trucks and trailers and in certain components of such systems. More particularly, the present invention relates to suspensions wherein a uniquely designed leaf spring is included as a component of the suspension. The uniquely designed leaf spring includes a relatively stiff front cantilever portion and a relatively soft rear cantilever portion. The front to rear cantilever stiffness ratio for a leaf spring of the present invention is preferably at least four to one or at least seven to one. To achieve this relatively high ratio, the leaf spring is designed so that the front cantilever is considerably thicker and shorter than the rear cantilever.

Axle suspension systems may be classified as having two general forms. A first form of axle suspension systems does not require auxiliary roll stabilizers because it utilizes leaf springs, coil springs and/or air springs which have a high vertical spring rate. The high vertical spring rate, however, provides for relatively uncomfortable riding conditions. A second form of axle suspension systems utilizes leaf springs, coil springs and/or air springs which have a soft vertical spring rate. Although this second form of axle suspension systems provides for relatively comfortable riding conditions, it generally lacks sufficient roll stability. The use of auxiliary roll stabilizers in such systems is often necessary, which increases the total cost and weight of these suspension systems. Based on the foregoing, it is desirable to provide a suspension system which, first, has sufficient roll stability such that the use of auxiliary roll stabilizers is unnecessary and, second, provides for relatively comfortable riding conditions for the vehicle.

SUMMARY OF THE INVENTION

One advantage of the present invention is the elimination of the auxiliary roll stabilizers which are typically required in suspensions utilizing soft spring rate leaf springs. To achieve that end, the front cantilever of the leaf spring is a low-stressed, stiff member so that it places the wheel axle in torsion during roll, thereby inherently creating so-called "roll stiffness." Based on the elimination of the otherwise necessary auxiliary roll stabilizers, the suspension may be lighter and less expensive to manufacture.

Another advantage of the present invention is that it provides for a more comfortable vehicle ride than those suspension systems utilizing springs having high vertical spring rates. Most noteworthy, a portion of the leaf spring of the present invention has a soft spring rate. In particular, the rear cantilever of the leaf spring is relatively compliant and provides a combined spring rate, when in series with an air spring mounted atop it, to offer a very low natural frequency of vertical deflection and thereby obtain ride comfort.

Another feature of the present invention is the use of a reverse arch within the rear cantilever. One advantage provided by this feature is that it positions the end portion of the leaf spring in close proximity with the vehicle chassis so that a relatively short hanger may be used to pivotally connect that portion with the chassis. As such, this feature positions the end portion of the leaf spring generally level with the center of the leaf spring eye when the leaf spring is connected to chassis. Another advantage provided by the reverse arch is that, in combination with the conventional forward arch of the front cantilever, it counteracts the lengthening of the leaf spring during jounce and rebound action so that the leaf spring produces little longitudinal motion. Yet another advantage provided by the reverse arch is that, in effect, it "cranks" during roll so that the axle is placed in torsion, which, in turn, increases the roll stability of the suspension.

In view of the foregoing, it is a principal object of the present invention to provide a novel component part of a suspension system whereby a comfortable ride is obtained and yet the use of auxiliary roll stabilizers is unnecessary.

It is a further object of the present invention to provide a uniquely designed tapered convolute leaf spring which includes a relatively stiff front cantilever portion and a relatively soft rear cantilever portion.

It is a further object of the present invention to provide a uniquely designed leaf spring wherein its front cantilever is considerably thicker and shorter than its rear cantilever.

It is yet another object of the present invention to provide a uniquely designed leaf spring wherein its front to rear cantilever stiffness ratio is preferably at least about four to one or at least seven to one.

It is still another object of the present invention to provide a uniquely designed leaf spring wherein its rear cantilever includes a reverse arch which counteracts the lengthening of the spring during jounce and rebound action, thereby permitting only a relatively small amount of longitudinal motion.

It is finally another object of the present invention to provide a uniquely designed leaf spring which reduces the manufacturing costs of the suspension by eliminating the need for otherwise necessary parts.

In accordance with these and other objects, the present invention comprises a new and improved leaf spring which is used in a suspension system that supports a frame member on one side of a vehicle chassis above an adjacent end of a vehicle axle. The leaf spring comprises an eye located at a first end thereof. A front cantilever portion extends from the eye to a predetermined point on the leaf spring. A rear cantilever portion extends rearwardly from the predetermined point to its endpoint which is positioned in at least close proximity to the second end of the leaf spring. A reverse arch portion is included within the rear cantilever portion. The leaf spring is designed so that the front cantilever portion has a relatively high spring rate and, conversely, the rear cantilever portion has a relatively low spring rate.

The above and other objects and features of the invention will be apparent to those skilled in the art from the following detailed description of a preferred embodiment taken in conjunction with the accompanying drawings wherein:

BRIEF DESCRIPTION OF THE DRAWINGS

FIG. 3 is a side elevational view of the tapered convolute leaf spring of the present invention;

FIG. 4 is a top view of the tapered convolute leaf spring of the present invention.

DETAILED DESCRIPTION OF THE PREFERRED EMBODIMENT

Figure 1:
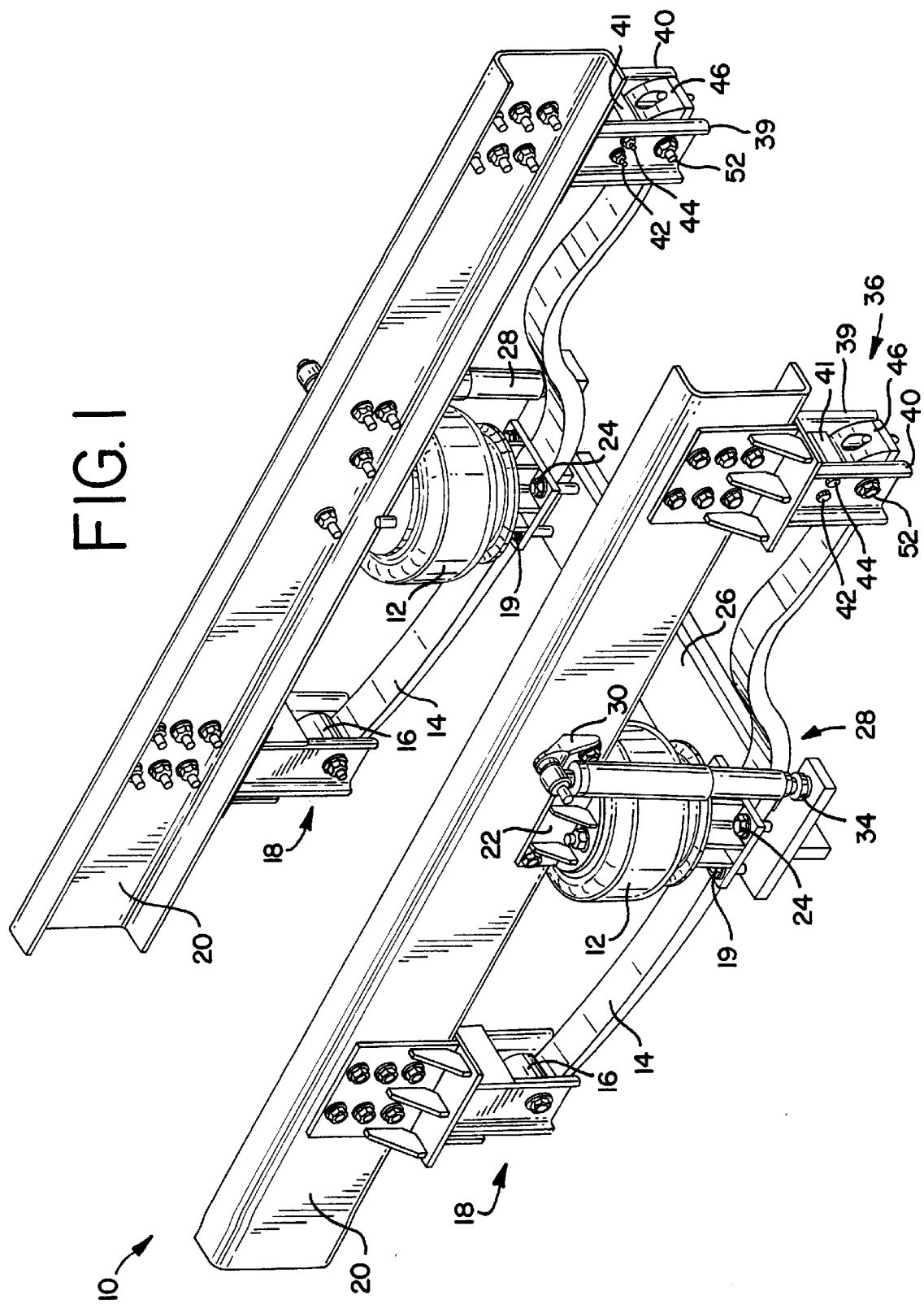
FIG. 1 is an isometric view of a suspension system for a vehicle such as a light duty truck wherein the suspension system includes a tapered convolute leaf spring of the present invention on each side.
Figure 2:
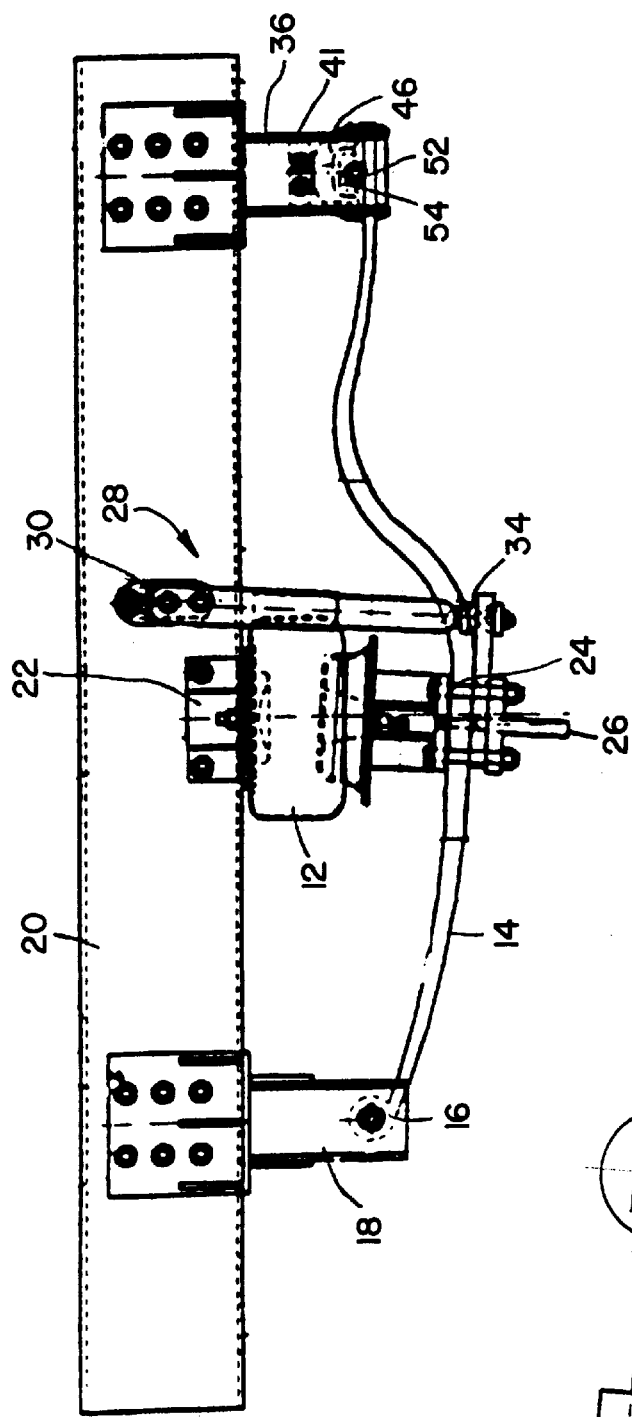
FIG. 2 is a side elevational view of the suspension system of FIG. 1 showing the tapered convolute leaf spring of the present invention.

Referring to the drawings, and in particular to FIGS. 1 and 2, a suspension system is shown therein and is generally designated by reference number 10. It will be seen and understood that the construction of this suspension system on one side is duplicated on the opposite side of the vehicle. The active or functional components of the suspension system 10 comprise two air springs 12—12 and two tapered convolute single-leaf leaf springs 14—14, of which the latter pair of active components is the focus of the present invention.

Each tapered convolute single-leaf leaf spring 14 is provided with an eye 16 located at the front end thereof. The eye 16 is pivotally connected to a standard or existing frame mounting bracket indicated generally by reference numeral 18. As shown, the frame mounting brackets 18 are mounted on each fore-and-aft extending chassis frame member 20 of the suspension system 10.

An upper air spring support bracket 22 is mounted on each chassis frame member 20 at a location that is over one end of the vehicle axle and over the mid-portion of the tapered convolute single-leaf leaf spring 14 on that side. The top of each air spring 12 is attached to its air spring support bracket 22. The bottom of each air spring 12 is mounted on an air spring support pad 24 which, in turn, is attached to an axle 26 extending from one side of suspension system 10 to the other side. As shown, each tapered convolute single-leaf leaf spring 14 extends between the air spring support pad 24 and the axle 26. Typically, the leaf spring is attached to the vehicle axle by bolts 19—19.

A shock absorber generally designated at 28 is further included within suspension system 10. The shock absorber 28 is pivotally connected at its upper end to a bracket 30 mounted on frame member 20 and is attached at its bottom end to axle 26 by a fitting 34.

The rear end portion of each tapered convolute single-leaf leaf spring 14 is operatively connected with frame member 20. A mounting bracket 36 having depending inner and outer panels 39, 40 is mounted on frame member 20. Preferably, a wear plate 41 is positioned between panels 39, 40 and is attached to the panels by two nut and bolt arrangements 42, 44. Moreover, a leaf spring attachment member 46 is preferably fixedly mounted to the tapered convolute single-leaf leaf spring 14. Two nut and bolt arrangements provide means for mounting the leaf spring attachment member 46 to the tapered convolute single-leaf leaf spring 14.

During assembly of the suspension system, the tapered convolute single-leaf leaf spring 14 is positioned between the panels 39, 40 of bracket 36 so that a rebound bolt 52 may be connected between the panels after it is inserted through the space defined by the top surface of the leaf spring and an interior recessed portion 54 of the leaf spring attachment member 46.

Leaf spring attachment member 46 permits the rear end of the tapered convolute single-leaf leaf spring 14 to move freely over a controlled range and, along with the wear plate 41, eliminates a moving point contact on the leaf spring and also creates a bearing surface, providing a more constant spring rate for each portion of the leaf spring during operation of the suspension system 10. Leaf spring attachment member 46 also provides an additional safety feature and eliminates the practical necessity, based on safety concerns, of using a military leaf wrap. In particular, should the eye 16 of the tapered convolute single-leaf leaf spring 14 become detached from the mounting bracket 18, the attachment member 46 ensures that the vehicle axle will maintain a secure connection with frame member 20 through the suspension system 10.

Referring now to FIG. 3, the tapered convolute single-leaf leaf spring 14 encompassing the focus of the present invention is shown in detail. As shown, tapered convolute single-leaf leaf spring 14 includes a front cantilever portion 55 which extends from eye 16 to a point shown as an aperture 56 located within the mid-portion of the leaf spring. In a specific preferred embodiment, the length between the centerpoint of eye 16 to point 56 is approximately 25 inches (635 mm) so that front cantilever portion 55 extends almost that same distance. As shown, cantilever portion 55 extends in a generally continuous direction from eye 16 to point 56 so that no corrugations are formed within that cantilever.

Tapered convolute single-leaf leaf spring 14 further includes a rear cantilever portion 57 extending between point 56 and an endpoint 58 of the rear cantilever portion positioned halfway between bolt receiving holes 59, 60. As shown, rear cantilever portion 57 extends in a generally continuous direction from point 56 to its endpoint 58 so that no corrugations are formed within that cantilever. In this specific preferred embodiment, the length of rear cantilever portion 57 is approximately 35 inches (889 mm). In this specific preferred embodiment, holes 59, 60 are positioned about five inches apart and an end portion 61 of the leaf spring 14 extends from hole 59 to an end 62 of the leaf spring. As so defined, a part of the end portion 61 of leaf spring 14 is coextensive with a part of the rear cantilever portion 57 defined above.

The front cantilever portion 55 includes a seat area generally designated at 63. Seat area 63 includes the bottommost point of tapered convolute leaf spring 14 when that leaf spring is connected to a vehicle chassis frame.

A reverse arch portion 64 is included within rear cantilever portion 57 of tapered convolute leaf spring 14. This reverse arch portion 64 accomplishes several of the advantages identified above.

Referring back to a specific preferred embodiment of the tapered convolute leaf spring 14, namely the preferred dimensions thereof, in the free state, the center of eye 16 is preferably about 3.49 inches above the bottommost point of the leaf spring, which is positioned in seat area 63. The top surface 65 of leaf spring 14 closest to its end 62 is about 15.71 inches above the bottommost point of the leaf spring.

Referring now to the preferred thicknesses of the tapered convolute leaf spring 14 at particular points along its length, the leaf spring is preferably about 1.0 inch thick at a point identified by reference numeral 66. Further, the tapered convolute leaf spring 14 is preferably about 0.38 inches thick at a point 68. As such, leaf spring 14 tapers off as it extends from its seat area 63 to its end 62. Within its front cantilever portion, leaf spring 14 preferably has a relatively constant thickness of about 1.0 inch.

Referring now to the preferred radii of curvature for the tapered convolute leaf spring 14 at several points 69, 72, 74 along its length, the preferred radius of curvature for leaf spring 14 is about 194 inches at point 69. At point 72, the preferred radius of curvature for leaf spring 14 is about 9.5 inches. And, at point 74 of leaf spring 14, the preferred radius of curvature is about 14 inches.

Referring now to FIG. 4, the top surface of tapered convolute leaf spring 14 is shown and it will be noted that the leaf spring has a uniform width throughout most of its length. The preferred width of leaf spring 14 is about 3 inches (76.2 mm). As shown, towards its end portion 61, the width of leaf spring 14 preferably tapers off to about 2.0 inches wide. Those skilled in the art will recognize that the above-identified preferred dimensions of the tapered convolute leaf spring 14 of the present invention produce a leaf spring having a relatively stiff front cantilever portion and a relatively soft rear cantilever portion to accomplish the above-noted objects and advantages of the present invention.

In view of these dimensions, those skilled in the art will recognize that the rear cantilever portion 57 of tapered convolute leaf spring 14 is somewhat longer than most typical leaf springs. As such, a low spring rate is obtained when the rear cantilever portion 57 is combined in series with its respective air spring 12 mounted to it. If the leaf spring is attached to frame member 20 (see FIGS. 1 and 2) in the conventional manner (i.e., parallel to the chassis center line), the leaf spring may interfere with equipment, such as a fuel tank, which is typically mounted to the chassis.

Figure 5:
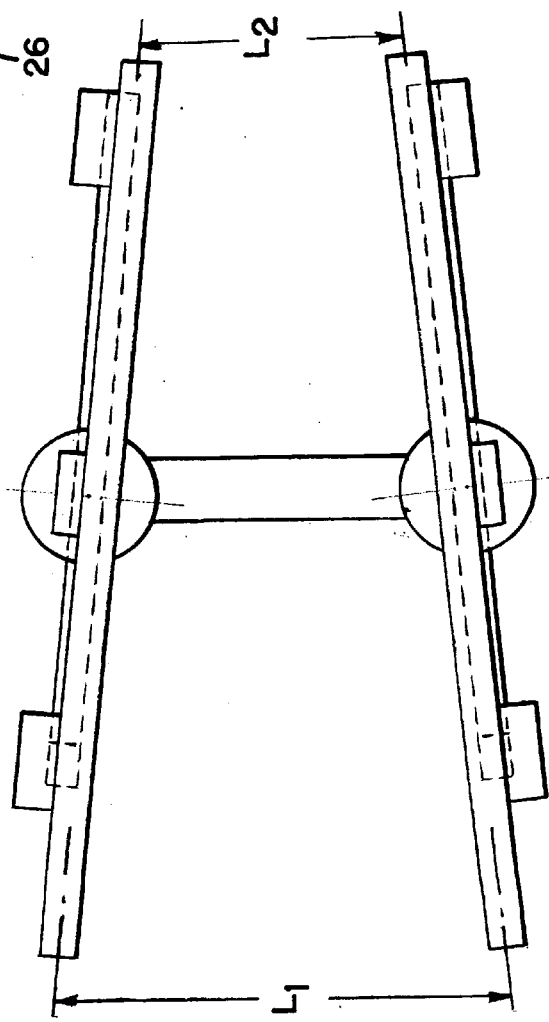
FIG. 5 is a diagrammatic plan view of a suspension system incorporating leaf springs made according to the principles of the present invention.

Referring now to FIG. 5, a solution to this packaging problem is shown. The tapered convolute spring 14 may be oriented so that it is not parallel to the fore-and-aft extending chassis center line but runs at an angle in the X,Y plane (standard SAE coordinates) so that the eyes 16—16 of the leaf springs 14—14 are spread further apart than the ends 62—62. In FIG. 5, the eyes 16—16 are shown as being spread apart by a distance $L_1$ and the ends 62—62 are shown as being spread apart by a distance $L_2$, which is less than $L_1$. Although, for illustrative purposes, FIG. 5 exaggerates this feature, in the preferred embodiment, each tapered convolute leaf spring 14 is connected to the frame member 20 at a two degree angle across the X axis.

Although the present invention has been described by reference to a certain preferred embodiment, it should be understood that this preferred embodiment is merely illustrative of the principles of the present invention. Therefore, modifications and/or changes may be made by those skilled in the art without departing from the true spirit and scope of the invention as defined by the appended claims.

I claim:

1. A leaf spring for use in a suspension system which supports a frame member on one side of a vehicle chassis above an adjacent end of a vehicle axle, said leaf spring comprising:
   an eye located at a first end of said leaf spring;
   a first cantilever portion extending in a generally continuous direction from said eye to a predetermined point on said leaf spring so that no corrugations are formed within said first cantilever portion;
   a second cantilever portion extending in a generally continuous direction from said predetermined point to an endpoint of said second cantilever portion positioned in at least close proximity to a second end of said leaf spring so that no corrugations are formed within said second cantilever portion;
   a reverse arch portion positioned within said second cantilever portion;
   said first cantilever portion having a relatively high spring rate;
   said second cantilever portion having a relatively low spring rate;
   said predetermined point being closer to said first end of said leaf spring than to said second end of said leaf spring; and
   said first cantilever portion being thicker than said second cantilever portion.

2. The leaf spring as defined by claim 1 wherein said first cantilever portion extends about twenty-five inches and said second cantilever portion extends about thirty-five inches.

3. The leaf spring as defined by claim 1 wherein said first and second cantilever portions are structured so that said leaf spring has a first to second portion stiffness ratio of at least four to one.

4. The leaf spring as defined in claim 1 further comprising a seat area positioned within said first cantilever portion.

5. The leaf spring as defined in claim 1 wherein said reverse arch portion positions said second end of said leaf spring at a point generally level with a centerpoint of said eye when said leaf spring is connected to a vehicle frame member.

6. The leaf spring as defined in claim 1 wherein said leaf spring comprises a single-leaf leaf spring.

7. A suspension system for supporting a frame member on one side of a vehicle chassis above an adjacent end of a vehicle axle, said suspension system comprising:
   (a) a first frame bracket mounted to said frame member;
   (b) a second frame bracket mounted to said frame member; and
   (c) a fore-and-aft extending leaf spring comprising:
      (1) an eye located at a first end of said leaf spring, said leaf spring being operatively connected to said first frame bracket at said eye;
      (2) a first cantilever portion extending in a generally continuous direction from said eye to a predetermined point on said leaf spring so that no corrugations are formed within said first cantilever portion;
      (3) a second cantilever portion extending in a generally continuous direction from said predetermined point to an endpoint of said second cantilever portion positioned within an end portion of said leaf spring and in at least close proximity to a second end of said leaf spring so that no corrugations are formed within said second cantilever portion, said leaf spring being operatively connected to said second frame bracket at said end portion of said leaf spring;
      (4) a reverse arch portion positioned within said second cantilever portion;
      (5) said first cantilever portion having a relatively high spring rate;
      (6) said second cantilever portion having a relatively low spring rate;
      (7) said predetermined point being closer to said first end of said leaf spring than to said second end of said leaf spring; and
      (8) said first cantilever portion being thicker than said second cantilever portion.

8. The suspension system as defined by claim 7 wherein said first cantilever portion extends about twenty-five inches and said second cantilever portion extends about thirty-five inches.

9. The suspension system as defined by claim 7 wherein said first and second cantilever portions are structured so that said leaf spring has a first to second portion stiffness ratio of at least four to one.

10. The suspension system as defined in claim 7 further comprising a seat area positioned within said first cantilever portion.

11. The suspension system as defined in claim 7 wherein said reverse arch portion positions said second end of said leaf spring at a point generally level with a centerpoint of said eye when said leaf spring is connected to said frame member.

12. The suspension system as defined in claim 7 wherein said leaf spring comprises a single-leaf leaf spring.

13. The suspension system as defined in claim 7 further comprising a shock absorber connected between said frame member and said axle.

14. The suspension system as defined in claim 7 further comprising a leaf spring attachment member mounted to said leaf spring and operatively connected with said second frame bracket.

15. The suspension system as defined in claim 7 further comprising an air spring operatively connected between said frame member and said axle.

16. The suspension system as defined in claim 9 wherein a first distance between said first end of said leaf spring and a vehicle center line is greater than a second distance between said second end of said leaf spring and said vehicle center line.

17. A suspension system for supporting a frame member on one side of a vehicle chassis above an adjacent end of a vehicle axle, said suspension system comprising:
 (a) a first frame bracket mounted to said frame member;
 (b) a second frame bracket mounted to said frame member; and
 (c) a fore-and-aft extending leaf spring comprising:
  (1) an eye located at a first end of said leaf spring, said leaf spring being operatively connected to said first frame bracket at said eye;
  (2) a first cantilever portion extending from said eye to a predetermined point on said leaf spring;
  (3) a second cantilever portion extending from said predetermined point to an endpoint of said second cantilever portion positioned within an end portion of said leaf spring and in at least close proximity to a second end of said leaf spring, said leaf spring being operatively connected to said second frame bracket at said end portion of said leaf spring;
  (4) a reverse arch portion positioned within said second cantilever portion;
  (5) said first cantilever portion having a relatively high spring rate;
  (6) said second cantilever portion having a relatively low spring rate;
 (d) a leaf spring attachment member mounted to said leaf spring and operatively connected with said second frame bracket;
 (e) a rebound bolt extending transversely through said second frame bracket; and
 (f) a wear plate associated with said leaf spring attachment member which is operatively connected to said second frame bracket.

* * * * *